June 28, 1938. R. F. SEDGLEY Re. 20,774
METHOD OF AND APPARATUS FOR CURLING STRAND MATERIAL
Original Filed July 17, 1935 2 Sheets-Sheet 1
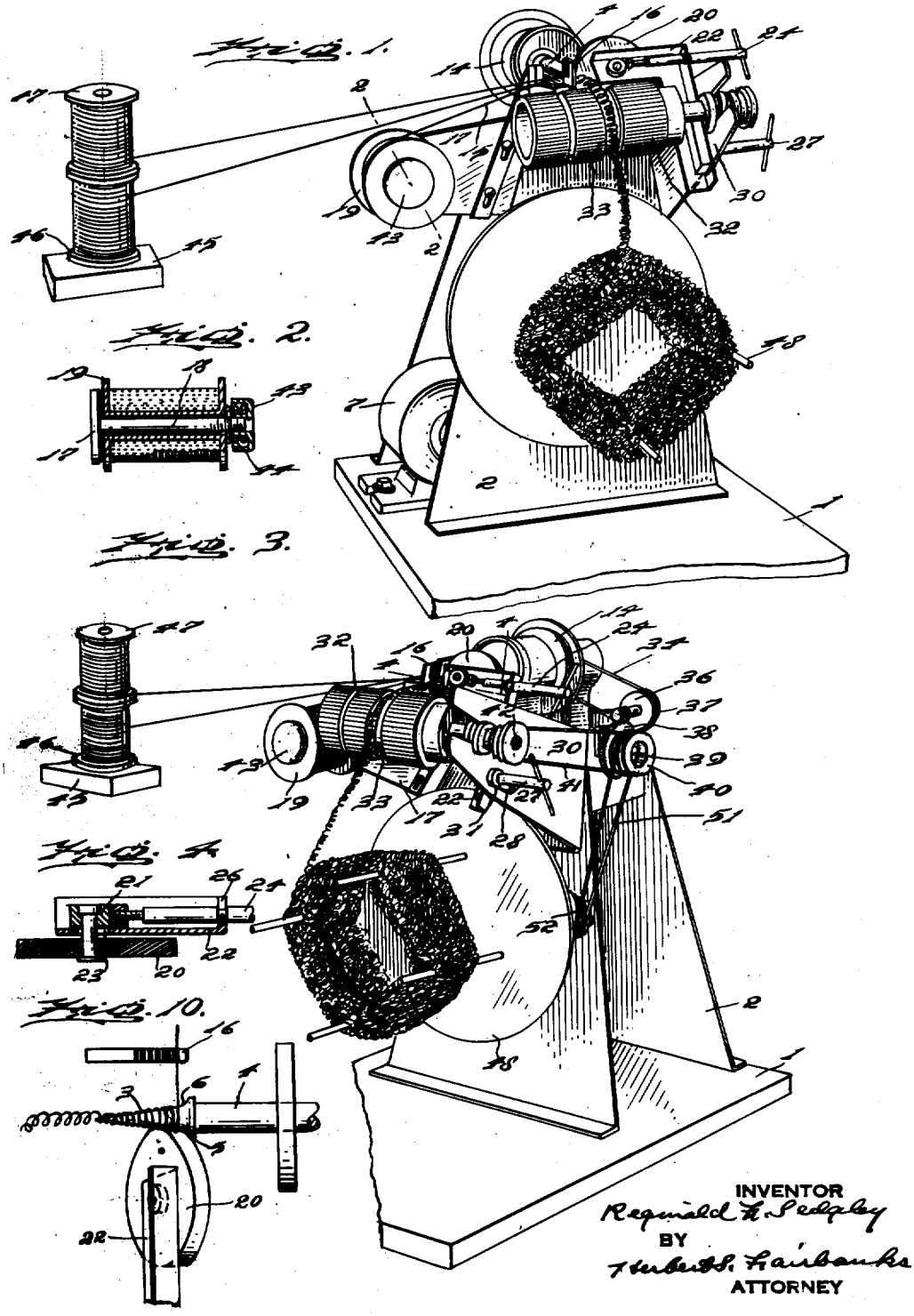
INVENTOR
Reginald F. Sedgley
BY
Herbert S. Fairbanks
ATTORNEY June 28, 1938. R. F. SEDGLEY Re. 20,774
METHOD OF AND APPARATUS FOR CURLING STRAND MATERIAL
Original Filed July 17, 1935 2 Sheets-Sheet 2
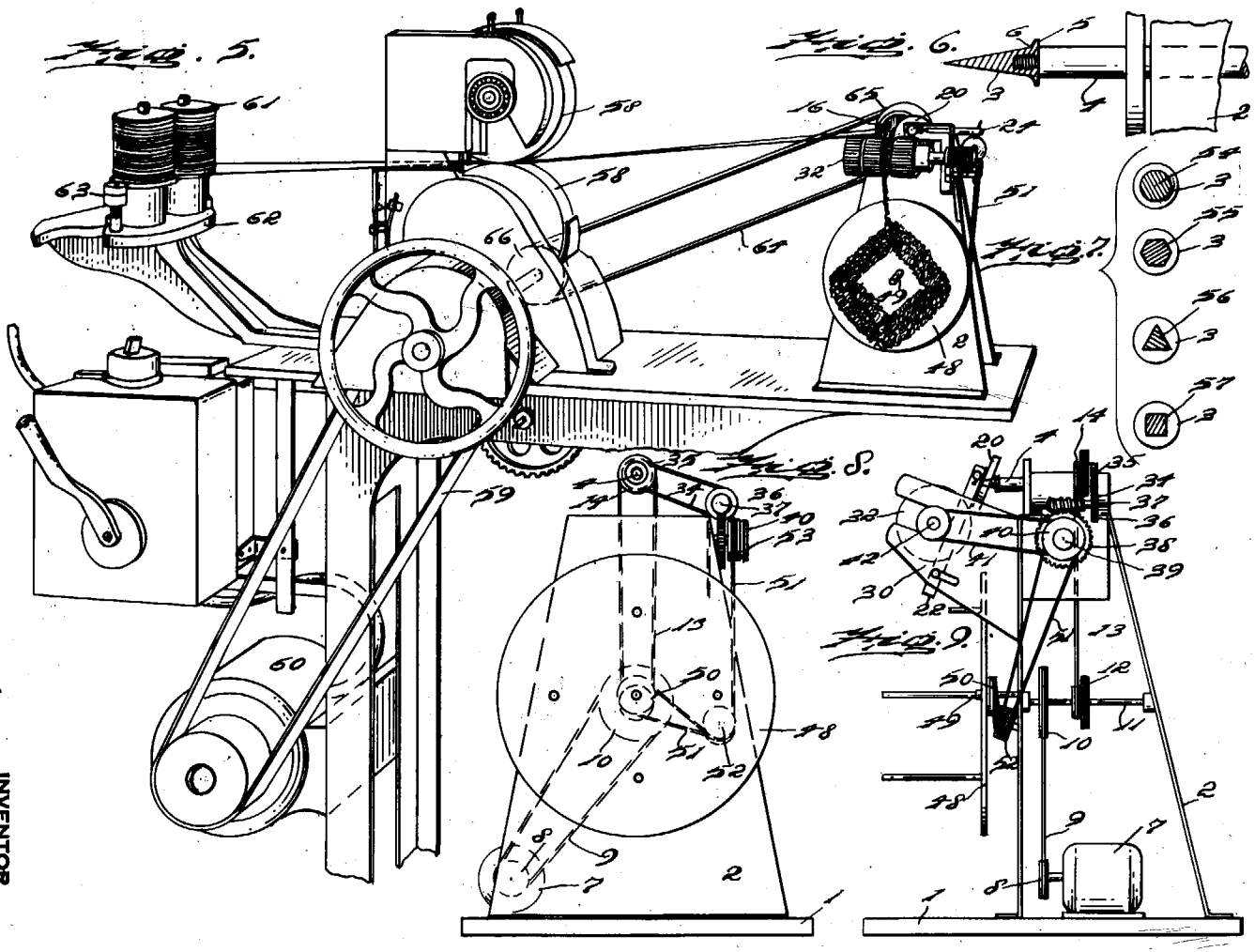
INVENTOR
Reginald F. Sedgley
BY
Herbert S. Fairbanks
ATTORNEY Reissued June 28, 1938 Re. 20,774

UNITED STATES PATENT OFFICE 20,774

METHOD OF AND APPARATUS FOR CURLING STRAND MATERIAL

Reginald F. Sedgley, Philadelphia, Pa., assignor to John W. Gottschalk Manufacturing Co., Philadelphia, Pa., a corporation of Pennsylvania Original No. 2,056,213, dated October 6, 1936, Serial No. 31,827, July 17, 1935. Application for reissue December 9, 1936, Serial No. 115,005

8 Claims. (Cl. 140—71)

My present invention relates to a novel method of and apparatus for curling or coiling strand material.

The strand material may be round or the round strand may be deformed to provide any desired contour in cross section. The deforming operation, if employed, may be performed separately from or simultaneously with the curling operation.

In my Reissue Patent No. 18,576, I have described and broadly claimed a novel Method of and machine for curling, wherein the strand is drawn under tension over a curling edge to impart to it an inherent tendency to form a helical coil when released from tension.

In my present invention the strand, preferably a metallic strand, passes directly from the deforming rolls, if the contour of the strand in cross section is to be changed, or directly from tensioned spools to a revolving mandrel which latter may be round or have any desired contour in cross section. As the strand winds around the mandrel, it is subjected to a frictional pressure which facilitates the automatic removal of the coiled strand from the mandrel.

The rolling may be done in the same machine or in a separate machine.

The coiled strand may be tangled, or reeled, and formed into bunches, or otherwise treated and packaged in accordance with the manner in which it is to be used.

One or more strands may be curled at a time around the same mandrel and collected on a single reel or on different reels, and, in practice, five separate strands have been simultaneously coiled to form a single flexible metallic bunch.

With the above and other objects in view as will hereinafter fully appear, my invention comprehends a novel method of and apparatus for curling or coiling strand material.

It further comprehends a novel method of and apparatus for curling one or more strands, wherein one or more strands are passed directly to a revolving and preferably tapered mandrel around which they are wound by the revolution of the mandrel and during the winding they are subjected to a frictional pressure which facilitates the progressive removal of the helical coils from the mandrel.

Other novel features of construction and advantage will hereinafter more clearly appear in the detailed description and the appended claims.

For the purpose of illustrating the invention, I have shown in the accompanying drawings typical embodiments of it, which in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a perspective view of an apparatus for curling strand material, and which may be employed in carrying out in practice my novel method.

Figure 2 is a section of a spool and its holder, the section being taken substantially on line 2—2 of Figure 1.

Figure 3 is a perspective view of the curling apparatus, taken at a different angle from that seen in Figure 1.

Figure 4 is a section taken substantially on line 4—4 of Figure 3, showing the pressure adjusting means for a friction roll.

Figure 5 is a perspective view of a combined machine embodying my invention, and, in which, one or more strands are rolled and curled at the same time in the same machine.

Figure 6 is a side elevation of the mandrel shaft, with one form of mandrel shown in section.

Figure 7 shows cross sectional views of different forms of mandrels.

Figure 8 is a side elevation of a portion of the curling mechanism, showing more particularly driving mechanism.

Figure 9 is a side elevation of Figure 8.

Figure 10 is a top plan view of the curling mandrel and certain of its adjuncts.

Similar numerals indicate corresponding parts.

Referring to the drawings:

Referring first to Figures 1 to 4, I will first describe a preferred construction which can be employed in performing the curling operation, since the name curling mechanism is illustrated in connection with the combined rolling and curling machine seen in Figure 1.

*The curling mechanism*

The curling mechanism is provided with a base 1, to which a frame 2, of any desired or conventional construction, is secured. 3 designates a tapered mandrel which is threaded at one end to adapt it to be detachably connected with a shaft 4 journalled in the frame 2. This mandrel 3 may have any desired contour in cross section. For example, it may be round or polygonal in cross section. The mandrel 3 at its inner end has an annular flange 5 and a fillet 6.

The shaft 4 may be driven by any desired source of power, and, for purpose of illustration I have shown an electric motor 7 mounted on the base 1. The shaft of the electric motor 7 has fixed to it a pulley 8, around which passes a belt 9, which also passes around a pulley 10 on a counter shaft 11, journalled in the frame 2. The counter shaft has a variable speed pulley 12 fixed to it, and a belt 13 passes around the pulley 12 and around a variable speed pulley 14 on the shaft 4 to effect the revolution at a desired speed of the mandrel 3. A strand 15, of material to be curled, passes through a slot in the guide or comb 16 to the curling mandrel 3, and one or more strands may pass through separate openings or the same opening in the guide 16. A spool support 17, has a spindle 18 to receive a spool 19, on which the strand to be curled is wound. Each spool is provided in some manner with means to produce a drag tending to retard the revolution of the spool so as to keep the strand taut as it is being unwound from its spool and while it is passing to the mandrel. This may be accomplished by the weight of a spool on its support or on another spool or by any desired type of frictional spool tensioning means such as is well known in the art. The spool may have frictional material between it and its support.

As the strands are wound around the mandrel 3, the coils of the strands are subjected to a frictional presure from a friction roll 20 revolubly mounted on a carrier 22, the pin, of the roller passing through a slot 23, see Figure 4. An adjusting rod 24 is grooved at 25 to enter a slot 26 and prevent longitudinal movement of the adjusting rod. The forward end of the adjusting rod 24 is threaded to the carrier 21 so that the friction roll 20 can be adjusted relatively to the mandrel 3. The bracket 22 has connected with it a rod 27 which passes through an inclined slot 28 in a bracket 30 secured to the machine frame, and a nut 31 threaded on the rod 27 secures the bracket 22 in its adjusted angular position, so that the friction roll may have its face disposed at an angle to the axis of rotation of the mandrel 3. The friction roll 20 is thus free to revolve when brought into contact with the revolving mandrel 3, and, if it is angularly disposed relatively to the curling mandrel, it facilitates the progressive removal of the coils from the free end of the curling mandrel.

The curled strand or strands pass from the free end of the curling mandrel over a slowly revolving roll 32, preferably provided with a groove 33 to position the curled strand or strands. The roll 32 is driven from the shaft 4 by a belt 34, see Figure 8, passing around a pulley 35 on the shaft 4 and around a pulley 36 on a worm shaft 37. The worm meshes with a pinion 38 on a stud shaft 39 which carries a pulley 40 around which passes a belt 41 which also passes around a pulley 42 fixed to the shaft of the revolving roll 32.

The strand carrying spools may be mounted in any desired manner. The main spool 19, see Figure 1, is mounted in the spool support 17 adjustably secured to the frame, and the headed spindle 18 has a tension adjusting member 43 in the form of a recessed nut to move a spring 44 against a head of the strand carrying spool, see Figure 2. Auxiliary strand carrying spools may be mounted in any desired manner. In Figures 1 and 2, I have shown a spool holder 45 the spindle of which carries the auxiliary spools 46 and 47 so that three strands are curled at the same time. Any desired number of strand carrying spools may be used, and in practice I have curled five strands at the same time to form a single bunch on the construction illustrated. The lower strand carrying spool is tensioned by the friction of its lower head on its support, and the upper spool by frictional engagement with the lower spool. The frictional drag thus formed can be increased by supplying friction creating material to the lower heads of the spools or in any other desired manner.

After the curled strand passes from the revolving roll, it may be tangled, reeled or treated in any desired or conventional manner to form metallic bunches. As illustrated, it is reeled into skein formation on a reel 48 rotatably mounted on the frame 2, and having its shaft 49 provided with a pulley 50, around which a belt 51 passes. The belt 51 passes also around a pulley 52 and around a pulley 53 on the shaft 49.

The curled strand accumulates on the reel until it is of a desired size and the operator cuts the strand, removes the skein, and allows it to contract to form a flexible metallic bunch. The operator then winds the free end of the cut strand around an arm of the reel, and the operation is repeated.

I make no claim to the reeling mechanism per se, as the curled strand or strands may be bunched or skeined in any desired manner.

In Figure 7, I have shown a few of many forms of curling mandrels which can be advantageously employed. At 54, the mandrel is shown as round in cross section. At 55, it is shown as having six sides; at 56 as having three sides; and at 57 as having four sides. The curling mandrel is preferably tapered but it may be in the form of a cylindrical rod or tube.

My present invention is especially adapted, although not limited to such use, for curling a metallic strand a few ten thousandths in thickness for the formation of flexible metallic bunches for use in cleaning and polishing any desired articles or materials.

As herein disclosed the strand may be rolled in a separate rolling unit, to any desired contour in cross section, spooled and the spools used on the curling apparatus which has its own motor drive. It may also be rolled and curled in the same machine as shown in Figure 1, wherein the construction for rolling and cycle of operation is substantially the same as that shown in my reissue patent, to which I have hereinbefore referred, and which is now well known in this art. The individual motor drive for the curling mechanism as herein disclosed may be employed in the combined rolling and curling machine, or the shaft 4 of the curling mechanism may be operatively connected in any desired manner with the driving means for the rolls which change the contour of the strand in cross section. The preferred form of strand is a round wire, which is flattened to form four abrading edges.

The deforming rolls 58 are driven by a belt drive 59 from an electric motor 60. A plurality of strand carrying spools 61 are carried by a spool holder 62, provided with a tension device 63 for each spool. The strands pass between the rolls 58, and therefrom to the strand guide and the curling mandrel. The shaft 4, in Figure 1, is driven by a belt 64, passing around a pulley 65 on the shaft 4, and around a pulley 66 on the shaft of the driving roll of the rolls 58. The rolls 58 place a tension or drag on the strands passing to the curling mandrel.

It will be apparent from the foregoing that, in carrying out in practice my novel method, the strand or strands are held taut between the rolls and the curling mandrel, or between the spools and the curling mandrel in case the wire has been preformed to provide the desired cross sectional contour. The strand or strands in the curling operation pass from the rolls 58 as in Figure 1 or from the spools as in the other figures around a revolving mandrel, preferably tapered, and curl around the mandrel and a plurality of strands can be curled to form a continuous helical coil the coils of which are progressively pushed off the mandrel by the coils in rear of them. To facilitate the progressive removal of the coils as they are formed from the curling mandrel, I employ a rolling frictional pressure against the coils on the mandrel and this pressure is preferably applied at an angle to the axis of rotation of the curling mandrel.

The strand after curling is in the form of coreless helical metallic strands, the coils of which can be interlocked in any desired manner to form a bunch of substantially fixed formation, but which is flexible and resilient, and, due to the tension inherent in the strands, the bunch when stretched and released will return to substantially its original formation. This enables one to maintain the bunch in a sanitary condition as it can be scrubbed, when stretched, with soap and water or other cleansing fluid to remove grease or other foreign matter adhering to it.

Any desired number of curling mechanisms can be assembled in a single machine with a common drive for the shafts 4, the rolls 32, the reels 48 and the flattening rolls, and as this will be clear to one skilled in this art, it is not deemed necessary to illustrate and describe in detail a multiple mandrel machine of such character, as it would involve unnecessary duplication in the drawings and description.

I have illustrated and described a friction roll 20, and, while I prefer to employ it, it can be omitted if desired as well as the revolving roll 32. In such case, the reel revolves at a suitable speed relatively to the curling mandrel to draw the coiled strand directly from the curling mandrel. The friction roll 20, if employed, is preferably of resilient material.

In accordance with this invention, the uncurled strand passes continuously as long as the supply lasts to the curling mandrel and automatically passes off the forward end of the mandrel.

The length of the curled or coiled strand is dependent only on the amount of wire at the strand supply.

It will now be apparent that I have devised a new and useful method of and apparatus for curling strand material which embodies the features of advantage enumerated as desirable in the statement of the invention and the above description, and while I have, in the present instance, shown and described preferred embodiments thereof which will give in practice satisfactory and reliable results, it is to be understood that these embodiments are susceptible of modification in various particulars without departing from the spirit or scope of the invention or sacrificing any of its advantages.

Having thus described my invention, what I claim as new and desire to secure by Letters Patent is:

1. The method of curling a plurality of metallic strands, which consists in simultaneously passing a plurality of metallic strands to a single, revolving mandrel, and subjecting the first turn of each strand on the mandrel to the pressure of the yielding surface of a revoluble roll to cause the independent curling of each of the plurality of strands.

2. The method of curling a plurality of metallic strands, which consists in simultaneously passing a plurality of metallic strands to a single, revolving mandrel, and subjecting the first turn of each strand on the mandrel to the pressure of the yielding surface of a revoluble roll to cause the independent and simultaneous curling of each of the plurality of strands.

3. The method of curling a plurality of metallic strands, which consists in simultaneously passing a plurality of metallic strands to a single, revolving mandrel, subjecting the first turn of each strand on the mandrel to the pressure of the yielding surface of a revoluble roll to cause the independent curling of each of the plurality of strands, and withdrawing the curled strands from the mandrel in the form of a single cord with adjacent coils of the different strands interlocked.

4. The method of curling a plurality of strands around a single revolving mandrel, which consists in simultaneously curling a plurality of metallic strands around a single mandrel and withdrawing the plurality of curled strands from the mandrel in the form of a single cord with adjacent coils of different strands interlocked.

5. In a curling apparatus, a strand supply, a positively driven revoluble mandrel, around which a strand is drawn from the strand supply by the revolution of the mandrel, means to revolve the mandrel, and means to exert the frictional, yielding pressure of a roll having its peripherial portion of rubber against the first turn of the strand on the mandrel to cause the curling of the strand in the form of a coreless helical strand.

6. In a curling apparatus, a plurality of sources of supply of metallic strands, a single revoluble mandrel around which a plurality of strands are drawn by the revolution of the mandrel, means to revolve the mandrel, and means to withdraw the curled strands from the mandrel in the form of a single cord with adjacent coils of different strands interlocked.

7. In a curling apparatus, a spool holder, a spool thereon containing a metallic strand, a tension device for the spool, deforming rolls to which the strand passes from the spool, a revoluble mandrel receiving the deformed strand, a roller having a resilient portion exerting a yielding, frictional pressure against the first turns of the strand around the mandrel, and means to revolve said deforming rolls and mandrel at a constant speed.

8. In a curling apparatus, a spool holder, a spool thereon containing a metallic strand, a tension device for the spool, deforming rolls to which the strand passes from the spool, a revoluble mandrel receiving the deformed strand, a roller having a resilient portion exerting a yielding, frictional pressure against the first turns of the strand around the mandrel, a strand guide in proximity to the mandrel, and means to revolve said deforming rolls and mandrel at a constant speed.

REGINALD F. SEDGLEY.